Figure 14:
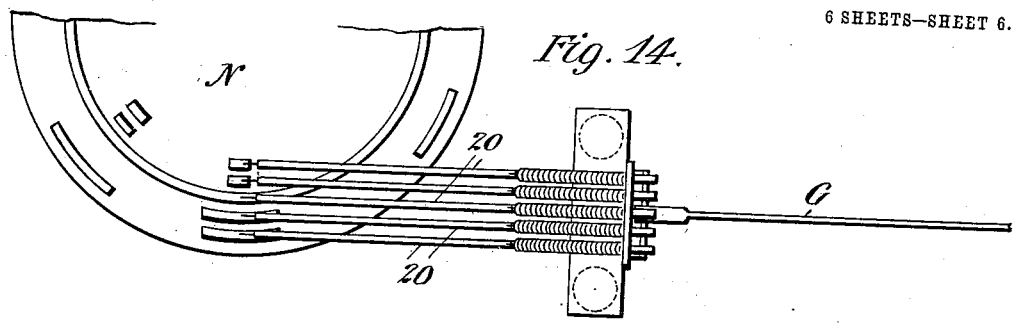
Figure 15:
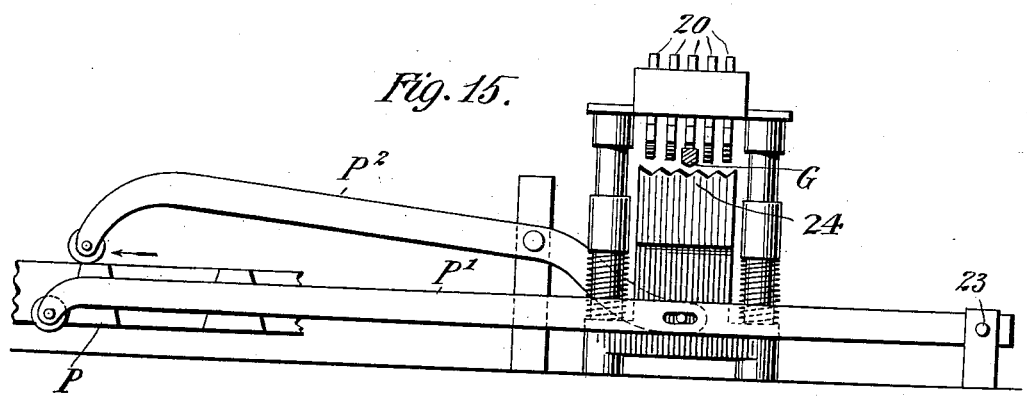
Figure 16:
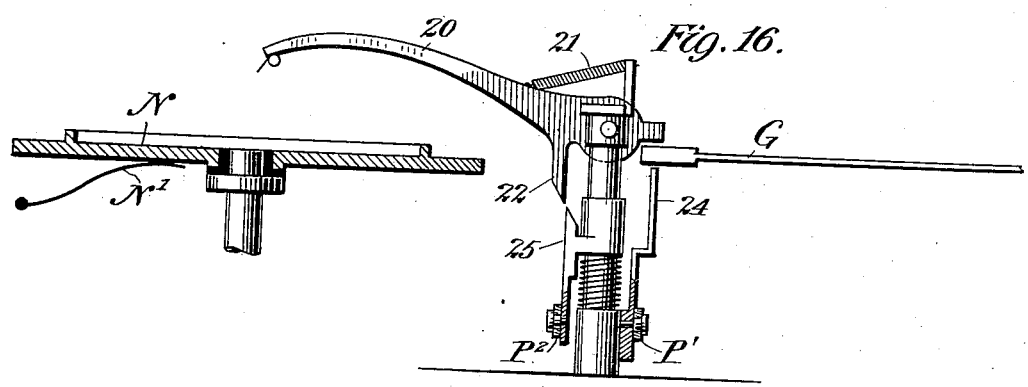

No. 742,681. PATENTED OCT. 27, 1903.
W. E. LAIRD.
AUTOMATIC INDICATOR.
APPLICATION FILED JAN. 13, 1902.
NO MODEL. 6 SHEETS—SHEET 1.
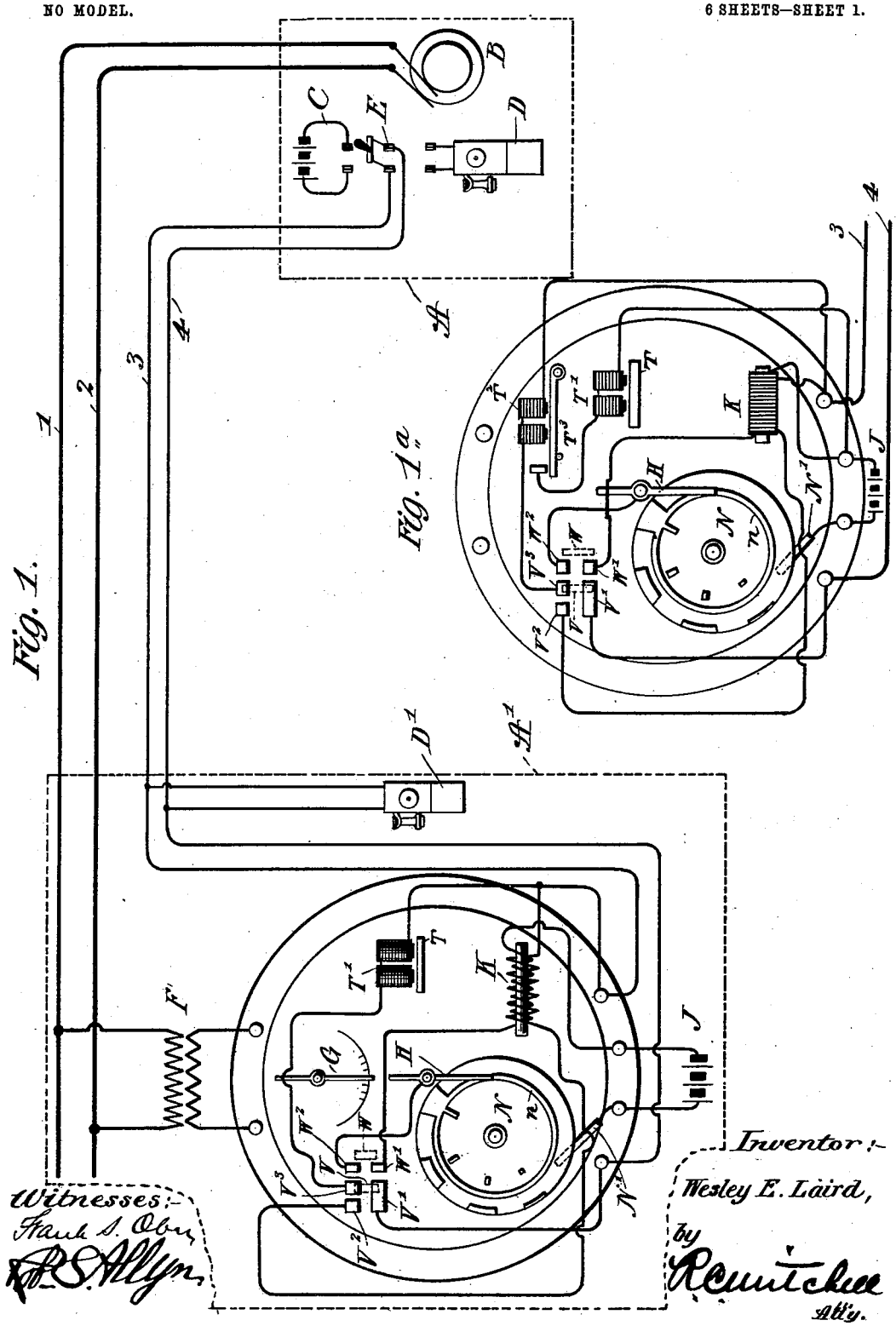
Witnesses:
Frank S. Ober
R. S. Allyn
Inventor:
Wesley E. Laird,
by R. Mitchell
Att'y.

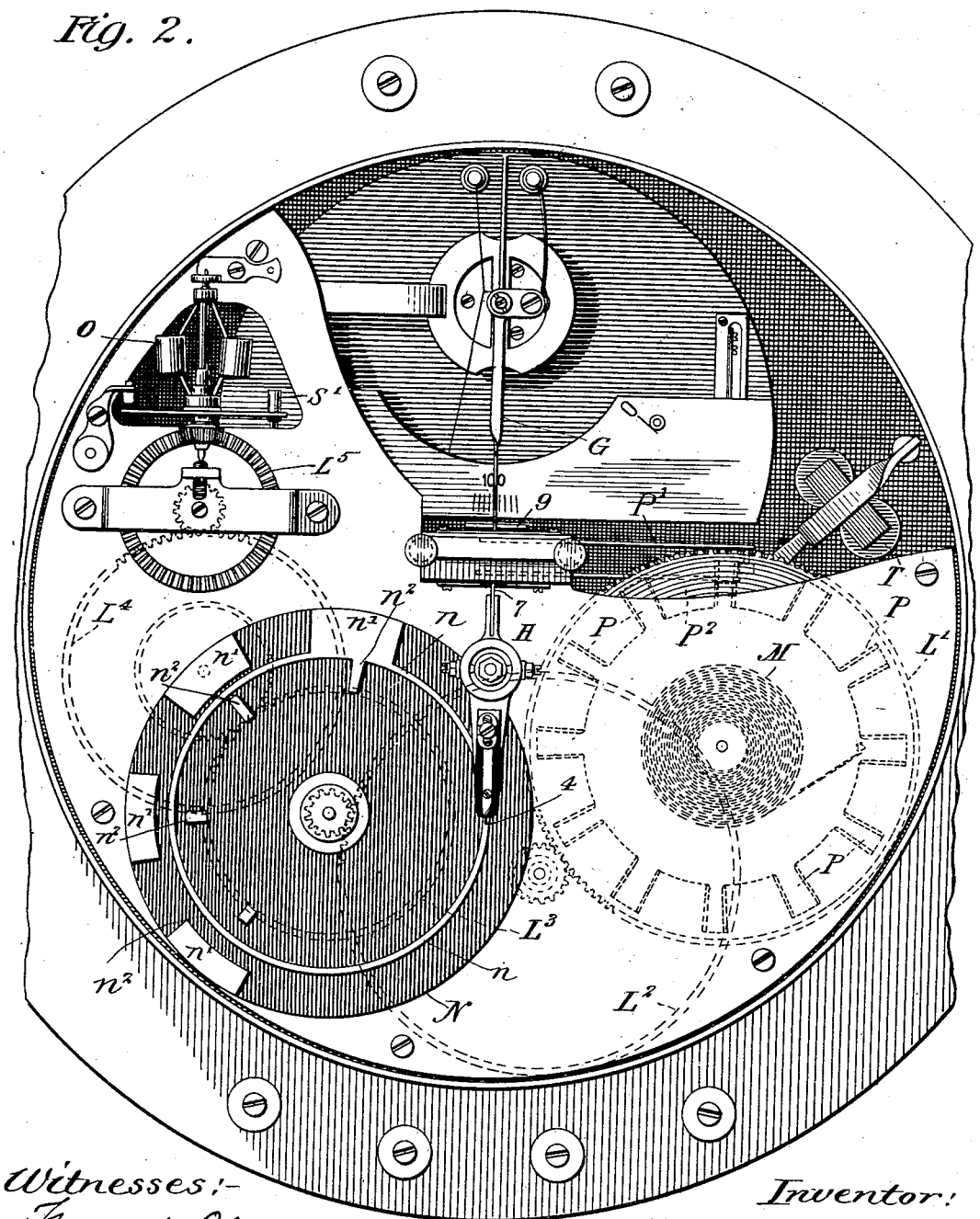

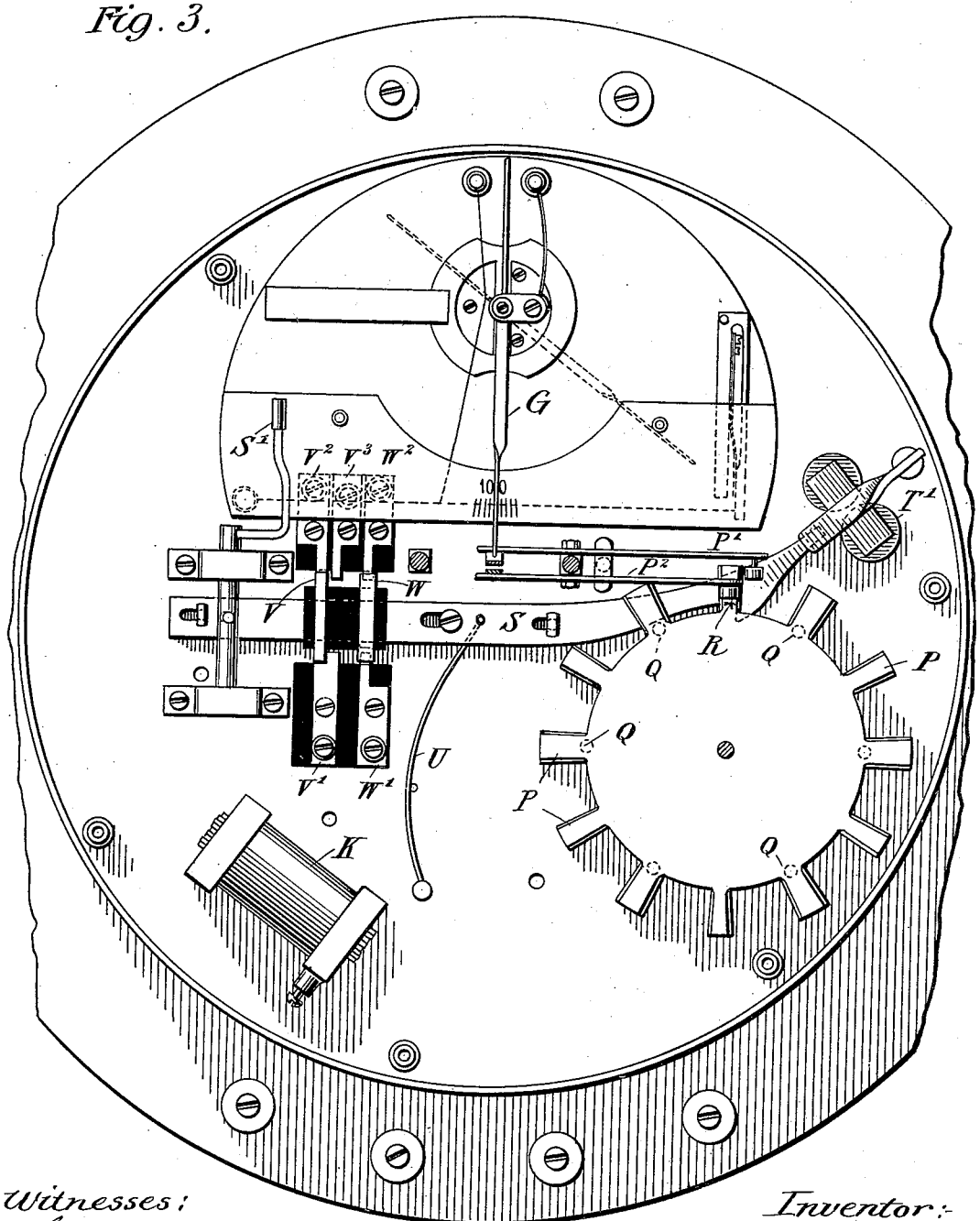

W. E. LAIRD.
AUTOMATIC INDICATOR.
APPLICATION FILED JAN. 13, 1902.
NO MODEL.
6 SHEETS—SHEET 4.
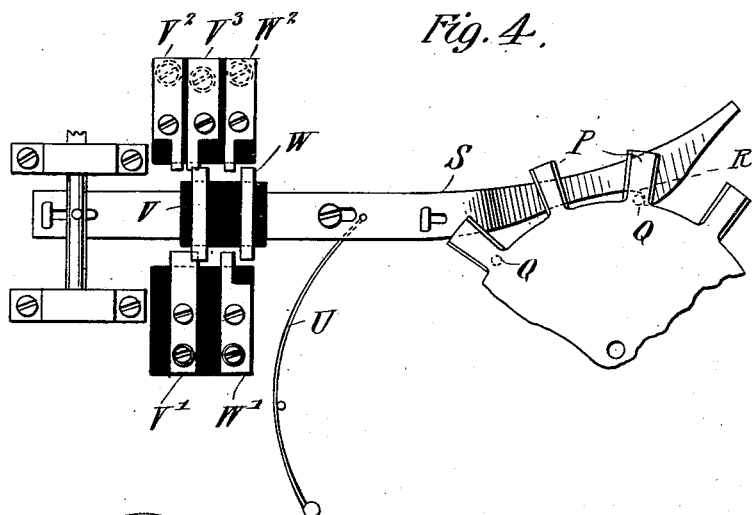
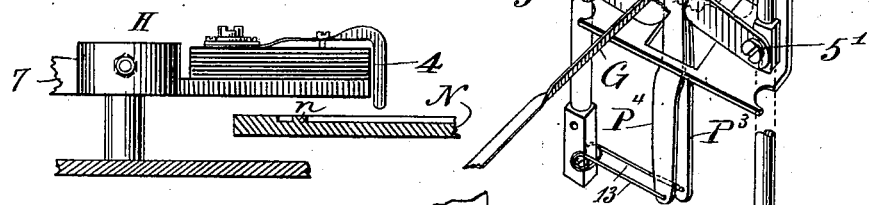
Witnesses:—
Inventor:—
Wesley E. Laird,
by
Attorney.

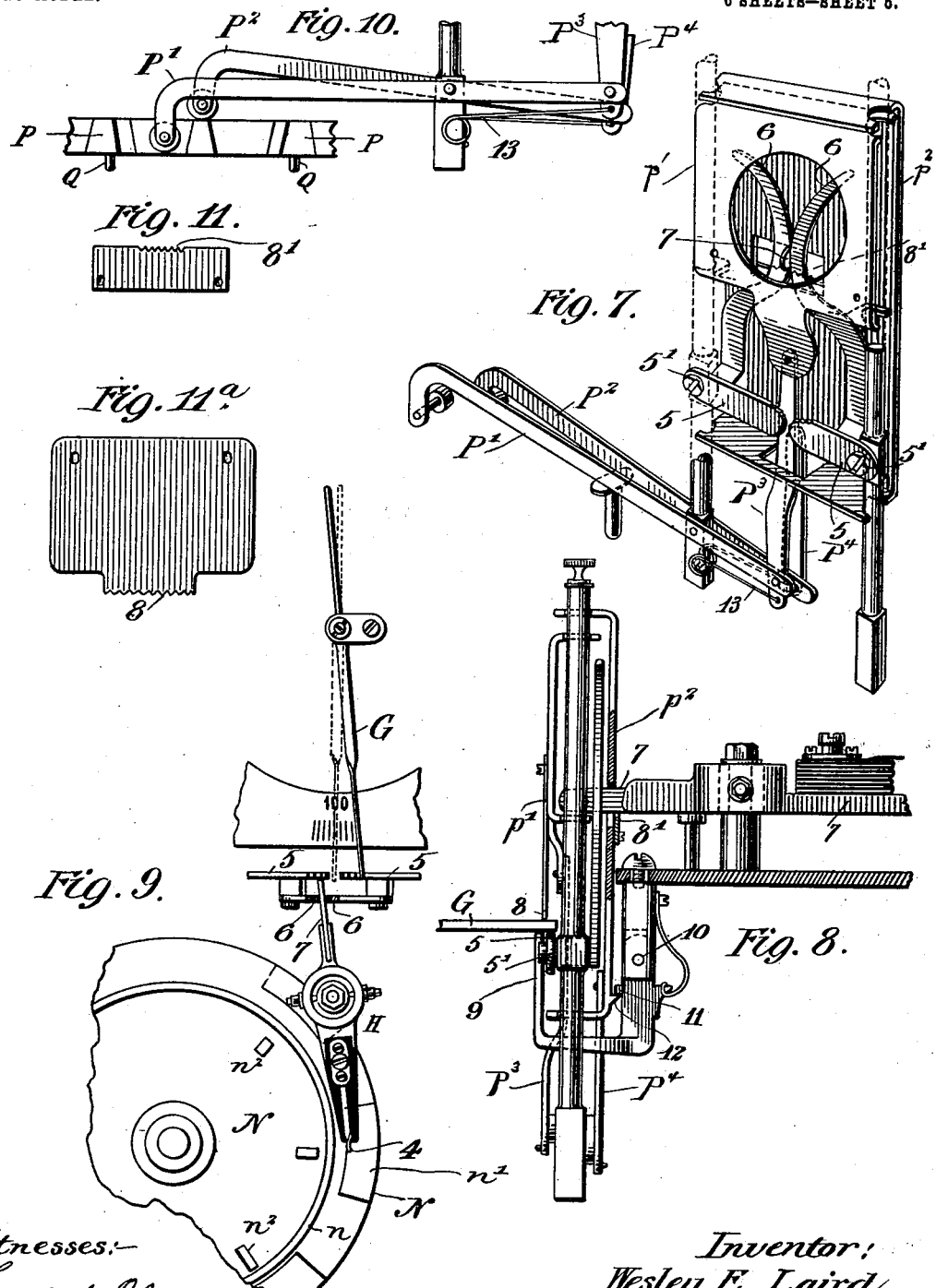

No. 742,681. PATENTED OCT. 27, 1903.
W. E. LAIRD.
AUTOMATIC INDICATOR.
APPLICATION FILED JAN. 13, 1902.
NO MODEL. 6 SHEETS—SHEET 6.

Witnesses:
Frank O. Ober
Rob't S. Allyn

Inventor:
Wesley E. Laird,
by R. C. Mitchell,
Attorney.

No. 742,681.

Patented October 27, 1903.

UNITED STATES PATENT OFFICE.

WESLEY E. LAIRD, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

AUTOMATIC INDICATOR.

SPECIFICATION forming part of Letters Patent No. 742,681, dated October 27, 1903.

Application filed January 13, 1902. Serial No. 89,635. (No model.)

*To all whom it may concern:*

Be it known that I, WESLEY E. LAIRD, a citizen of the United States, residing at Pittsfield, Berkshire county, Massachusetts, have invented certain new and useful Improvements in Automatic Indicators, of which the following is a full, clear, and exact description.

My invention relates to automatic indicators, and has for its object to provide means for indicating at a convenient point conditions existing at some remote point.

It consists of apparatus adapted to measure the electrical conditions at a given point in a circuit and to transmit to a distance definite signals corresponding with such measurements, together with means controlled from a distance for setting the apparatus in operation. Such an apparatus is particularly desirable in the case of small electric plants in which the generator is located at a considerable distance from the translating device and where it is desirable or necessary to have all the men in charge of the system at the generating-station for the greater part of the time, these conditions being those of many small plants. By such a means the persons in charge of the generating-station can easily ascertain the conditions at remote portions of the system, thus doing away with the expense of a special attendant or of special observations at such points.

The following is a description of my apparatus, reference being had to the drawings, in which—

Figure 1 represents the circuit arrangements of my system, Fig. 1ª being a modification of such circuits. Fig. 2 is a plan view of the working parts of the apparatus at the remote point. Fig. 3 is a plan view with certain portions removed. Fig. 4 is a detail view of an automatic stop mechanism and switch. Fig. 5 is a detail view of the starting mechanism. Figs. 6, 7, and 8 are detail views of automatic adjusting mechanism. Fig. 9 is a further illustrative view of the same in connection with other parts. Fig. 10 is a view of the cam-wheel and levers for operating the adjusting mechanism. Figs. 11 and 11ª are toothed racks forming parts of the adjusting mechanism. Fig. 12 is an enlarged view of a contact device operated by the adjusting mechanism. Fig. 13 is a detail view of automatic brake. Figs. 14, 15, 16, and 17 are views of a modification which may be substituted for the adjusting mechanism and contacts shown in Figs. 6 to 9, inclusive.

Referring more particularly to the drawings, A is a generating-station containing the dynamo B, from which lead the mains 1 2, and also containing means for controlling the operation of the indicating system and receiving the indications, said means consisting of a battery C, a telephone or receiving device D, and a switch E, which switch serves to put the conductors 3 4 in circuit with either the battery C or the telephone D.

A' is a remote station at which the transmitting device is located, being any convenient point in the neighborhood of the distribution center.

D' is a telephone connected to the mains 3 and 4 for use when desired.

F is a step-down transformer across the lines 1 2, forming a part of a suitable voltmeter or voltage device, (indicated at G.)

H is a contact member adjusted so as to make electrical connection with certain raised portions of a disk or controller member N at points corresponding to the position of the needle of the voltmeter G, so that when the device is in operation upon completing the circuit through a local battery J by means of the induction-coil K, which is connected to the mains 3 4, impulses due to the controller N are transmitted to the telephone D at the generating-station, said impulses corresponding to said raised portions.

Referring to the detail drawings of the apparatus located at the remote station, L' L² L³ L⁴ L⁵ is a train of gears operated by the spring M, which is wound up after the manner of an ordinary clock-spring. Upon the pinion of the member L³ is a disk or controller member N, having a circular raised portion $n$ and an exterior and interior raised portion $n'$ $n^2$. The last member of the train L⁵ operates a small governor O for the purpose of controlling the speed of the clockwork. Connected to the shaft of the member L' is a cam P, there being twelve cam-surfaces, located upon projecting teeth coöperating with levers P' P² for operating the contact-making mechanism through links P³ P⁴. Upon the bottom of this cam P are projecting studs Q, which as the cam revolves engage with the recess R upon the slide S. The end of this slide S is depressed by the extension T when the magnet T' is energized, and the recess R is thereby disengaged from the projection Q, permitting the slide S to be moved to the left by the spring U. The slide S carries two contact-pieces V W, which make electrical contacts with the members V', V², and V³ and W' W², completing certain circuits for the purpose hereinafter described. The automatic contact-adjusting and contact-making mechanism serves to adjust the position of the contact device H with reference to the disk N, so that it will correspond to a position of the needle of the voltmeter G, and consists of two levers 5 5, to which are connected two curved arms 6 6, between which is held one end 7 of the lever H, to which the contact 4 is attached. The levers 5 5 are pivoted at 5' 5' and have at their ends roughened edges, over which the end of the voltmeter-needle G swings. The levers P' P² operate, through links $p^3$ $p^4$, two slides $p'$ $p^2$, having toothed racks at 8 8', as shown in Figs. 11 11ᵃ. The first of these racks 8 is operated by the upward movement of the outer end of the lever P', caused by the movement of the cam P. This operation causes the rack 8 to be depressed so as to engage the needle of the voltmeter G, Fig. 8, causing it to be depressed so as to engage the inner end of one of the levers 5 5, Fig. 6, thereby depressing said lever to a corresponding extent and throwing the rounded surfaces 6 6 to one side or the other, thus correspondingly moving to the right or left the end 7 of the lever H, which lies between them. While the parts are in this position, the end of the lever P² is released by the cam P, so that it falls and raises the slide $p^2$, so that the toothed rack 8' engages with the end of the lever 7, lifting it, and consequently depressing the contact 4, until it comes into engagement with the disk N, its position being determined by the engagement or non-engagement of the needle of the voltmeter G with the arms 5 5. Thus when the needle of the voltmeter G engages with the lever 5, as shown in Fig. 9, the contact 4 will be thrown a corresponding distance to the right, so as to engage with at least one of the external raised surfaces $n'$ on the disk N, while if the engagement were with the other lever 5 the contact 4 would be thrown so as to make contact with one or more of the internal raised portions $n^2$ of the disk N, and if the needle of the voltmeter G lies directly between the two ends of the levers 5, as shown in dotted lines, Fig. 9, the contact 4 would make contact with the continuous raised portion $n$ of the disk N. In case the voltmeter should be out of order or the voltage should fall to a very considerable extent, so that the voltmeter-needle did not engage with the arms 5 5 or lie between them, means have to be provided for preventing the contact 4, which would then lie in the central position, from making any connection with the disk N. This is accomplished by providing a small arm 9, which extends in front of the levers 5 5, so as to be depressed whenever the needle lies in any permissible range. This arm 9 is pivoted at 10 and carries a latch 11, which engages with a projection 12 upon the slide $p^2$ and prevents that slide from moving, so as to act upon the lever 7. It will thus be seen that unless the arm 9 is depressed no contact will be made with the disk N and no indication transmitted to the central station. This absence of any indication would of course signify that something was wrong and requiring immediate attention. It is to be noted that the levers P' P² are both spring-controlled at 13 and that the lever P', which operates the slide $p'$, which in turn acts upon the needle G, is actuated by the cam for a very short interval of time—only that required in passing over the crest of the cam-tooth. The lever P², however, is actuated by the spring 13 as soon as the cam P permits such action, so that the slide $p^2$ remains elevated for a considerable length of time—namely, so long as it takes to pass from one cam-tooth to another—and during this time the disk N, bearing the raised portions, will have made several revolutions. The clockwork continues to run, and signals will be transmitted until one of the studs Q engages with the recess in the slide S and draws it to the rest position. This opens the transmitting-circuits, closes the interruption in the starting-circuit, as shown in Fig. 4, and also applies a brake S' to the disk of the governor, thereby stopping the clockwork.

The manner of operation of the device is as follows: The switch E is first thrown to connect the battery C in circuit. This sends a current over the lines 3 4 and energizes the magnet T', the circuit at this time being completed by the contacts V V' V³, the slide S being in the position shown in Fig. 4. The switch E is then thrown in the other direction to put the telephone D in circuit. As soon as the slide S is released by the pressure of the arm T, actuated by the magnet T', the brake S' releases the governor and the clockwork is set in motion. The spring U in moving the slide laterally has shifted the contacts V and W, so that they connect V' V² and W' W², respectively, as shown in Fig. 3. With the contacts V and W in this position a circuit is completed, including the telephone D at the generating-station, the main 3, the secondary coil on the induction-coil K, the contacts V² V V', and the conductor 4, so that when the contact 4 engages the contact-surfaces of the disk N there will be established a local circuit, including the battery J, the primary of the induction-coil K, switch-contacts W W' W², contact 4, disk N, and contact-brush N'. Whenever the disk N revolves and the contact 4 is brought into contact therewith, electrical impulses from the battery J will flow to the induction-coil K, corresponding to the raised portions of the disk N, engaged by the contact 4. Thus if the contact 4 is upon the circular ridge $n$ there will be one continuous or uninterrupted sound. In case, however, the lever H, carrying contact 4, were displaced, so as to bring the contact 4 slightly within the continuous circle, there would at slow intervals be one staccato sound through the telephone at the generating-station. In case it were still further within the circle there would be two, three, or four staccato sounds corresponding to its position. In the same way in case it were out of the circle slightly there would be one sound of some length, and if it were still further removed from the circle there would be two, three, or four sounds of similar length, the number and duration of the sounds indicating clearly to the attendant the position of the contact 4, and hence the position of the voltmeter-needle G and the voltage at the distribution-station at that time.

It will be seen from the foregoing description of the apparatus and its operation that the person in charge at the central station can easily ascertain by such apparatus the condition of the line at the remote station through a very considerable range of voltage, and thus insure the maintenance of a more constant pressure at the distribution center, and consequently a more satisfactory service.

Figure 17:
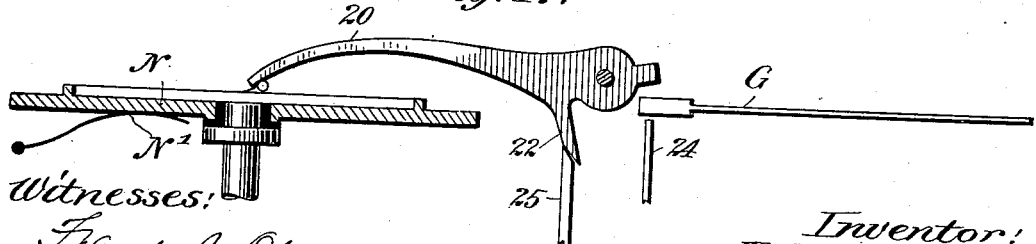

In the modification shown in Figs. 14 to 17 I have dispensed with the swinging lever H on which the contact 4 was carried and substituted for it and the means of adjustment five levers 20, as shown in plan view in Fig. 14. Each of these levers is restricted by a spring 21 and has a downward projection 22 having a beveled end. Moreover, the lever P' instead of being fulcrumed midway of its length is extended and fulcrumed at its extreme end at 23, so as to raise the portion 24, to which it is attached. When now the voltmeter-needle G is within the range of the toothed rack 24 and the apparatus is put in operation by impulse from the generating-station, the rack 24 engages with the voltmeter-needle G and lifts it, so as to engage one of the levers 20 which corresponds to its position. As soon as it is raised the outer end of the lever P², having been released by the cam P, falls and operates to raise the slide 25, which is of the same width as the rack 24, and engages by its beveled surface with the beveled end of the projection 22, holding the lever 20, which has been depressed, in its depressed condition, as shown in Fig. 17, the rack 24 being then permitted by the cam P to recede and release the voltmeter-needle. This arrangement has some advantages in the way of simplicity of construction and action and accomplishes substantially the same results.

Fig. 1ª shows a modification of circuit arrangements such that the impulse from the battery C in the generating-station operates a relay which closes a circuit through a local battery including the magnet T', thus enabling the use of a considerably smaller battery at the generating-station. In the diagram Fig. 1ª, T² is the relay-magnet, being in circuit with the battery C at the generating-station. When a current is transmitted from the generating-station over the lines 3 and 4, it operates a relay T³, which closes a local circuit through the magnet T' and battery J, thus operating the armature, which actuates the projection T to release the slide S. This interrupts the circuit through the relay-magnet T², which in turn interrupts the circuit through the magnet T', the other circuits necessary for the transmission of indications being made in the same manner as in Fig. 1.

It is obvious that many other variations in the instrumentalities used in my apparatus can be made.

What I claim is—

1. In combination, an electrical measuring instrument, a movable contact controlled thereby, a rotary switch adapted to coact with said contact to produce electrical impulses corresponding to the relative positions of said contact and switch, and an electric circuit including said switch and said contact.

2. In combination, an electrical measuring instrument, a movable contact controlled thereby, a rotary switch adapted to coact with said contact to produce electrical impulses corresponding to the relative positions of said contact and switch, and means for transmitting said impulses to a distance.

3. In an apparatus of the character described, a distribution-circuit, an electrical measuring instrument, a transmitter adapted to coact therewith, a clock mechanism for actuating the said transmitter, an electric circuit for starting said clock mechanism, the indications of said electrical measuring instrument being conveyed to a receiving-station through the said transmitting mechanism.

4. In an apparatus of the character described, an electrical measuring instrument in a distribution-circuit, a receiving-circuit, a switch for controlling the receiving-circuit, a transmitting mechanism, a clock mechanism for actuating the same, means for releasing said clock mechanism when the receiving-circuit is energized, means for automatically opening the receiving-circuit when the clock mechanism is started and closing it again through the circuit influenced by the transmitter at which time intelligence of the indications of the electrical measuring instrument is conveyed through the transmitting mechanism and thus to the receiving-station.

5. In an electrical system of distribution in combination, a voltage-indicating device varying with changing voltages, means for producing electrical impulses corresponding to the indications of said device, and means for transmitting said impulses to a distance.

6. In combination, a voltage device, a contact member controlled thereby, a circuit-controller, means for moving said controller, a circuit for conveying impulses produced by said controller, to a distance and a receiver and battery adapted to be connected to said circuit, and a starting-magnet adapted to be actuated by the current from said battery.

7. The combination of a voltmeter-needle, a composite contact member, a controller member, and means for causing the one of the component parts of the contact member corresponding to the position of said voltmeter-needle to make contact with said controller.

8. The combination of the needle G, controller N, the composite needle 20 and the cam-controlled slides 24, 25 for actuating the same.

9. The combination of the starting-magnet T, the detent-slide S, the projections Q engaging therewith, and switches actuated by said slide for alternately connecting the conductors leading to a distant point with said magnet when the indicator is at rest and with a source of electric impulses when it is in motion.

10. In an electrical apparatus, the combination of a measuring-instrument needle, a composite contact member, a controller member, and means for causing one of the component parts of the contact member corresponding to the position of said needle to make contact with said controller.

11. An electrical indicating system comprising a distribution-circuit and a receiving-circuit, a voltage device in the distributing-circuit, a transmitting mechanism in the receiving-circuit, said voltage device controlling said transmitting mechanism.

12. An electrical indicating system comprising a distribution-circuit and a receiving-circuit, a voltage device in the distribution-circuit, a transmitting mechanism in the receiving-circuit, means in said receiving-circuit for setting the voltage device into coöperation and then conveying the result of the measurement of the voltage device through the transmitting mechanism.

13. A system for the measurement of potential comprising a distribution-circuit, a step-down transformer therein, a voltmeter connected with the transformer and means for automatically conveying the readings of the voltmeter to a receiving-station.

14. An electrical measuring device comprising a distribution-circuit, a transformer therein, a voltage device actuated through one member of the transformer, a transmitting mechanism and means for conveying indications of the reading of the voltage device through said transmitter to a receiving-station.

15. An electrical measuring instrument comprising a distribution-circuit, a voltage device, a transmitter, a clock mechanism for actuating the same, an electric circuit for starting said clock mechanism, the indications of said voltage device being conveyed through said transmitting mechanism.

16. An electrical measuring instrument comprising a voltage-measuring device in a distribution-circuit, a receiving-circuit, a switch E for controlling the receiving-circuit, a transmitting mechanism, a clock mechanism for actuating the same, means for releasing said clock mechanism when the receiving-circuit is energized, means for automatically opening the receiving-circuit when the clock mechanism is started and closing it again through the circuit influenced by the transmitter at which time the indications of the voltage device are conveyed through the transmitting mechanism and thus to the receiving-station.

17. In a device of the character described, the combination of a voltage device in an electrical distribution-circuit, a transmitting mechanism, a clock mechanism for actuating the transmitter, a cam-plate P actuated by the clock mechanism and operating-levers coacting with said cam, means actuated by one of said levers for coacting with the needle of the voltage device, and means carried by the other lever for coacting with a member of the transmitter whereby the position of the needle governs the position of that transmitter member.

Signed at Pittsfield, Massachusetts, this 24th day of December, 1901.

WESLEY E. LAIRD.

Witnesses:
JOHN F. KELLY,
DAVID B. RUSHMORE.